(12) United States Patent
Chen

(10) Patent No.: US 6,672,789 B2
(45) Date of Patent: Jan. 6, 2004

(54) SPHERICAL CONNECTOR AND SUPPORTING ROD ASSEMBLY

(76) Inventor: Chung-Teng Chen, P.O. Box No. 6-57, Chung-Ho City, Taipei Hsien 235 (TW)

( * ) Notice: Subject to any disclaimer, the term of this patent is extended or adjusted under 35 U.S.C. 154(b) by 51 days.

(21) Appl. No.: 09/783,315

(22) Filed: Feb. 15, 2001

(65) Prior Publication Data

US 2002/0110411 A1 Aug. 15, 2002

(51) Int. Cl.[7] .............................. F16B 7/00; E04H 12/10
(52) U.S. Cl. ..................... 403/171; 403/176; 403/217; 52/655.1; 52/656.9
(58) Field of Search ................................ 403/170, 171, 403/176, 169, 217; 52/665, 648.1, 650.2, 655.1, 655.2, 656.9

(56) References Cited

U.S. PATENT DOCUMENTS

| | | | | |
|---|---|---|---|---|
| 3,333,875 A | * | 8/1967 | Tracy ..................... | 403/170 X |
| 3,632,147 A | * | 1/1972 | Finger ..................... | 403/171 |
| 3,921,360 A | * | 11/1975 | Baldwin ................. | 403/171 X |
| 3,953,948 A | * | 5/1976 | Hogan .................... | 403/176 X |
| 4,129,975 A | * | 12/1978 | Gabriel ................... | 403/171 X |
| 4,231,198 A | * | 11/1980 | Augier et al. ........... | 403/171 X |
| 4,326,354 A | * | 4/1982 | Hagberg ................. | 403/263 X |
| 4,438,615 A | * | 3/1984 | Wendel .................. | 403/171 X |
| 4,606,669 A | * | 8/1986 | DeBliquy ................ | 403/170 |
| 4,676,043 A | * | 6/1987 | Grimm ................... | 403/171 X |
| RE33,438 E | * | 11/1990 | Stewart .................. | 403/176 X |
| 5,051,019 A | * | 9/1991 | Kohl ....................... | 403/171 |
| 5,433,549 A | * | 7/1995 | McGaffigan ............ | 403/170 X |
| 5,590,974 A | * | 1/1997 | Yang ....................... | 403/171 X |
| 5,651,630 A | * | 7/1997 | Nomura .................. | 403/170 X |
| 5,667,326 A | * | 9/1997 | McGaffigan ............ | 403/171 X |
| 5,839,248 A | * | 11/1998 | Liang ..................... | 403/171 X |
| 5,961,365 A | * | 10/1999 | Lambert ................. | 403/170 X |
| 6,022,165 A | * | 2/2000 | Lin ......................... | 403/170 X |
| 6,109,573 A | * | 8/2000 | Liao et al. .............. | 403/170 X |

FOREIGN PATENT DOCUMENTS

| | | | | |
|---|---|---|---|---|
| CH | 671813 A5 | * | 9/1989 | ................ 403/171 |
| GB | 2187812 A | * | 9/1987 | ................ 403/171 |
| JP | 3-113106 | * | 5/1991 | ................ 403/171 |

* cited by examiner

Primary Examiner—Christopher J. Novosad
(74) Attorney, Agent, or Firm—Troxell Law Office PLLC

(57) ABSTRACT

The invention herein of a spherical connector and supporting rod assembly is mainly designed as a structure of a multi-angular spheroid with multiple tangent planes of six cubical quadrilaterals and twelve beveled hexagons, and with mounting holes disposed respectively at the centers of the quadrilateral and the beveled hexagonal tangent planes to make each spherical connector having eighteen mounting holes with included angles pointing at different directions so as to increase the application of a single spherical connector and to make all the spherical connectors have the identical structure for exchangeable connection to not only fully comply with the needs of specific application, but also to be able to make various applications by using the supporting rods pointing at different mounting angles to directly fulfill the specific need of the assembly.

3 Claims, 4 Drawing Sheets

SPHERICAL CONNECTOR AND SUPPORTING ROD ASSEMBLY

BACKGROUND OF THE INVENTION

1. Field of the Invention

The invention herein of a spherical connector and supporting rod assembly mainly provides a spherical connector not limited by the position and the order of assembly but capable of enabling the user to quickly identify the correct mounting holes to be connected with the supporting rods extending to various directions; more especially, every single spherical connector has the same external shape and the same mounting method for the mounting holes and is exhangeable to not only enhance the speed and convenience of assembling, but also reduce the molding cost of manufacturing the spherical connector.

2. Description of the Prior Art

As shown in FIG. 1 of the isometric drawing of the assembled framework of the conventional beam structure, the entire beam framework structure is constructed by a spherical joint (A) connected with the supporting rods (B), wherein the supporting rods (B) are lapped in various directions according to the specific configuration required. The main function of the spherical joint (A) is to have pre-mounted mounting holes (A1) facing specific directions to comply with the need of the included mounting angles of the supporting rods. When assembly the beam framework structure, the end portion of every supporting rod (B) has to be fixedly inserted into the specific mounting hole (A1) on the spherical joint according to the order of the predetermined and pre-calculated plan to connect all the supporting rods into the structure of the desire beam framework.

However, the structure of the beam framework aforementioned is not limited to the architectural design only, by connecting the spherical joints with the supporting rods, the simple assembly with certain structural strength can be widely applied in the ordinary life, for examples, as a storage shelf, an exhibit cabinet, a table, a chair, etc., assembled in proper shapes to comply with the specific requirement. However, in order to be convenient for the drilling of various degrees of angles, the external shape of the conventional spherical joint appears as a round ball. Furthermore, since every mounting hole is drilled according to a specific degree of angle, the mounting method of the included angle of every mounting hole on the spherical joint will be different. Therefore, every spherical joint with its own specific mounting order and position not capable for exchangeable connection not only reduces the variation of the entire structure of the beam framework, but also fails to meet the need of space alternation required by the user. Furthermore, the smooth external ball shapes of all the spherical joints make the distinguishing of each mounting hole difficult, that increases the trouble and the inconvenience of assembling.

SUMMARY OF THE INVENTION

Therefore, the invention herein of a spherical connector and supporting rod assembly, by designing the entire external shape of the spherical connector as a spherical structure of a multi-angular spheroid with multiple tangent planes of six cubical quadrilateral and twelve beveled hexagonal tangent planes connected among the side lines of the six quadrilateral tangent planes, and with mounting holes disposed respectively at the centers of the quadrilateral and the beveled hexagonal tangent planes to make each spherical connector have eighteen mounting holes with included angles pointing at different directions to increase the application of a single spherical connector and to make the structures of all the spherical connector the same for exchangeable connection, has the main objective of not only complying with the needs of specific application, but also being capable of making various applications to meet the requirement of specific assembly for the alternation of different degrees of mounting angles.

Another objective of the invention herein of a self-assembled spherical connector is to use the external design of the polygonal sphere to distinguish the tangent planes of all the mounting holes into the shapes of squares and hexagons to allow the user to quickly identify the positions of desired mounting holes for assembling so as to increase the precision and convenience of assembling.

Yet another objective of the invention herein of a self-assembled spherical connector is to thread the inside of the mounting holes on the spherical joint for the structural need of the supporting rods to provide the fixedly fastening of the threads on the end portion of the supporting rod to enhance the connection strength among all the supporting rods.

To enable a further understanding of the objectives and the technological methods of the invention herein, the brief description of the drawings below is followed by the detailed description of the preferred embodiments.

DETAILED DESCRIPTION OF THE PREFERRED EMBODIMENTS

Figure 1:
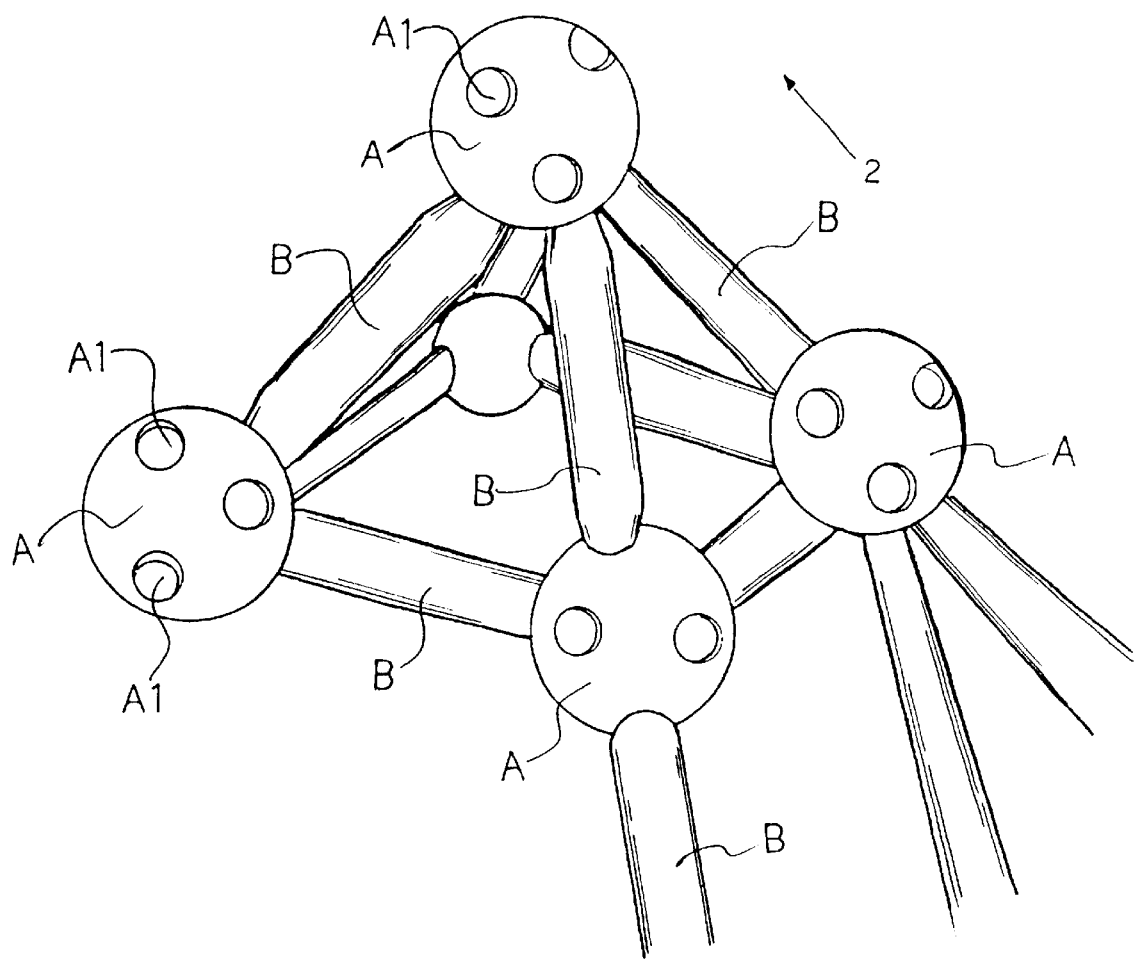
FIG. 1 is an isometric drawing of the assembled structure of the conventional beam framework.
Figure 2:
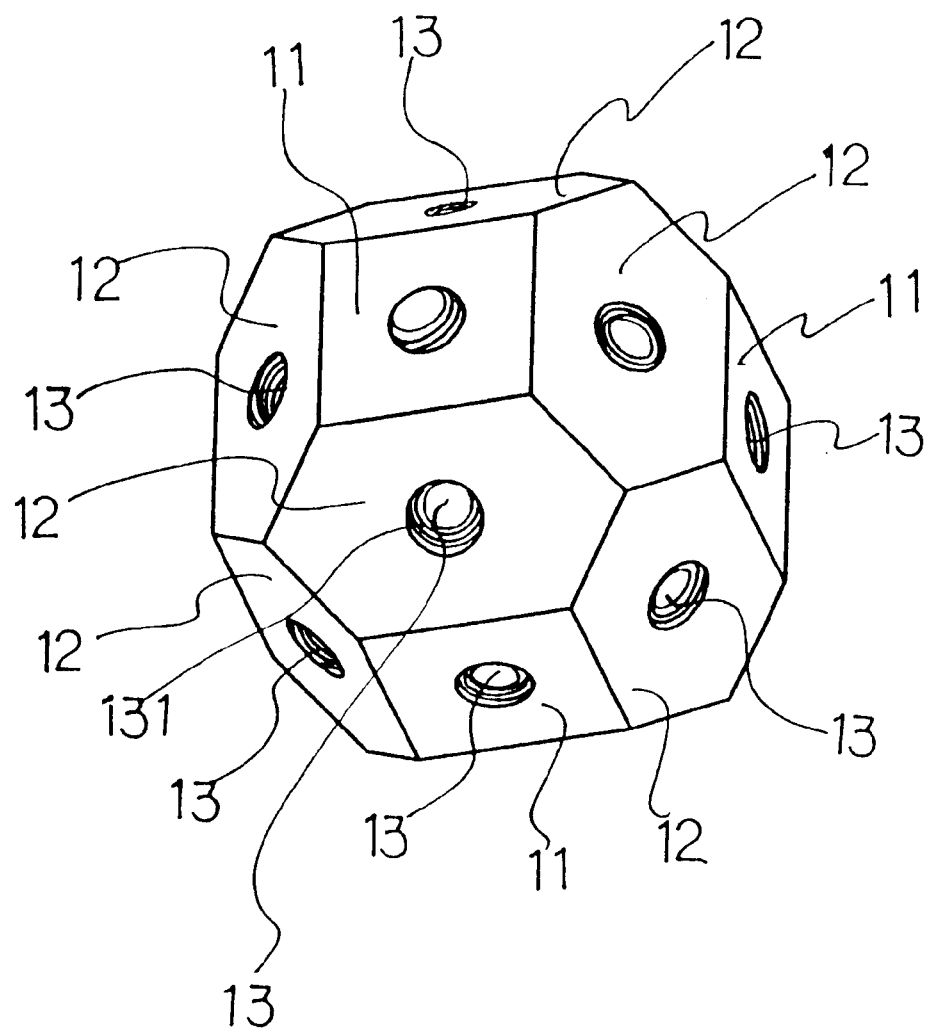
FIG. 2 is an isometric drawing of the external view of the spherical joint structure of the invention herein.

Referring to FIG. 2 of the basic structure of the spherical connector of the invention herein of a self-assembled spherical connector, every spherical connector (1) has the same external structure shape and the same design for the mounting holes (13). Wherein, the entire external shape of the spherical connector (1) is designed as a structure of a multi-angular spheroid with multiple tangent planes. The external sides of the spherical connector 91) has six tangent planes (11) of cubical quadrilaterals with twelve tangent planes (12) of beveled hexagons connected among the side lines of the six quadrilateral tangent planes, and with mounting holes (13) disposed respectively at the centers of the tangent planes of the squares (11) and the beveled hexagons (12) to make each spherical connector (1) have eighteen mounting holes (13) with included angles pointing at different directions to not only increase the application of a single spherical connector (1), but also to comply with the needs of specific application by making variations of different degrees of mounting angles to directly fulfill the need of a specific assembly.

Figure 3:
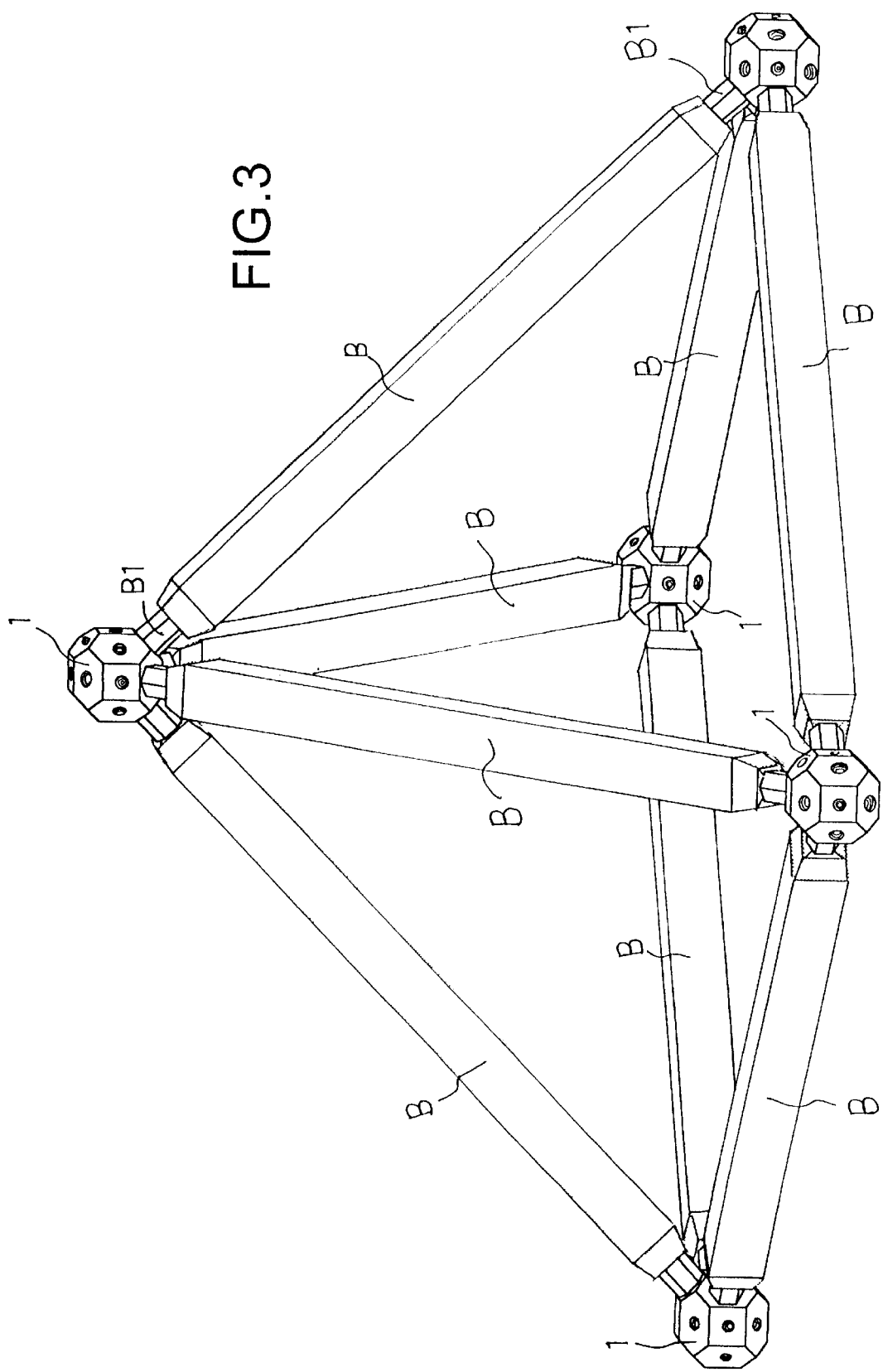
FIG. 3 is an isometric drawing of the assembled connection among the spherical joints and all the supporting rods of the invention herein.

Referring to FIG. 3, since every spherical connector (1) of the invention herein has the same external shape and the same mounting method for the mounting holes (13), every spherical connector (1) is exchangeable without the limit of specific mounting position and order; more especially, every spherical connector (1) has eighteen mounting holes (13) with included angles pointing at different directions to substantially enable the spherical connector (1) to be connected with the supporting rods (B) extending to different directions; furthermore, the tangent planes of the mounting holes (13), distinguished in the shapes of squares and hexagons on each spherical connector (1), enable the user to quickly identify the position of the desired mounting holes (13) for assembling; therefore, the situation of being misassembled will be reduced to tremendously increase the precision and convenience of assembling to suit the operation of the user with less techniques and to meet the fashion of the DIY in the present society.

Figure 4:
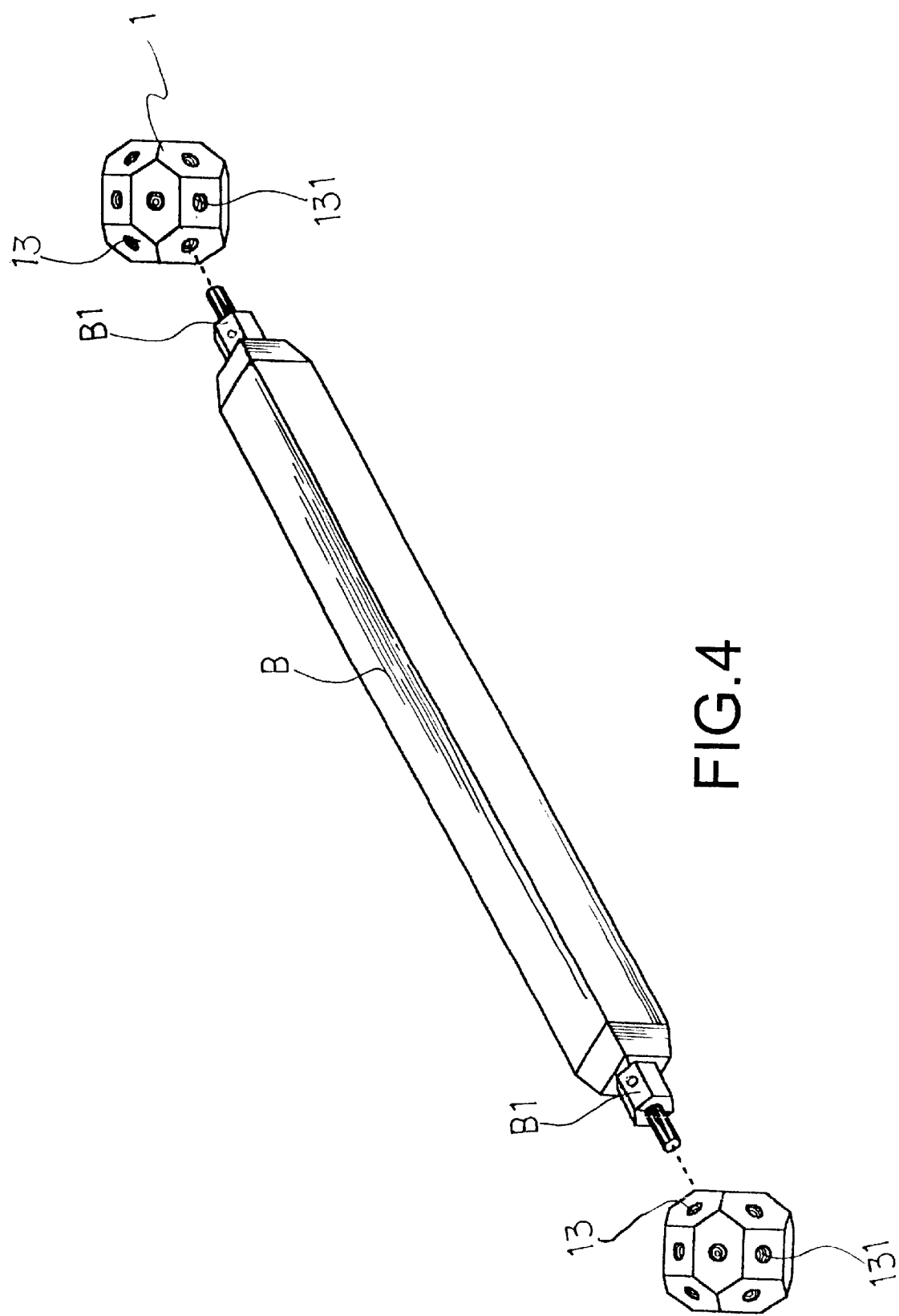
FIG. 4 is an isometric drawing of the assembling structure among the spherical joints and the supporting rod of the invention herein.

Furthermore, as shown in FIG. 4, in addition to be directly inserted by the supporting rods (B), the inside of the mounting holes (13) of the spherical connector 91) of the invention herein can be threaded (13) to fixedly fasten with the threads (B1) at the end portion of the supporting rods (B) to meet its structural need and to increase the connection strength among all the supporting rods (B); of course, the structure between the threads (B1) on the end portion of the supporting rod (B) and the body of the supporting rod (B) can be made extendable for the two ends of the supporting rods (B) to be retained into the correct positions of the mounting holes (13) on two spherical joints, then the threads (B1) will be screwed into the mounting holes (131) to finish the connection among the supporting rods (B) and the spherical connector (1).

The invention herein of a self-assembled spherical connector has been designed to make the entire external shape of the spherical connector as a spherical structure of a multi-angular spheroid with multiple tangent planes. Each spherical joint has eighteen mounting holes with included angles pointing at different directions to increase the application of every single spherical connector and to make the spherical connector have the same structure and exchangeable to fully meet the need of specific application. Furthermore, it is capable of making variations of different degrees of mounting angles to directly comply with the requirement of the specific assembly. Especially, the shapes of the squares and the hexagons of the tangent planes of the mounting holes enable the user to quickly identify the positions of the desired mounting holes to increase the precision and convenience of the assembly. Therefore, the invention herein providing a preferred embodiment for the structure of the spherical connector in the style of assembled beam framework fully complies with all new patent application requirements and is hereby submitted to the patent bureau for review and the granting of the commensurate patent rights.

What is claimed is:

1. A polyhedron connector and supporting rod assembly comprising:
    a) a plurality of polyhedron connectors, each having six, spaced apart, planar quadrilateral faces and twelve planar hexagonal faces, wherein each side of each of the spaced apart quadrilateral faces adjoins one side of one of the hexagonal faces, each of the quadrilateral faces and hexagon faces has a mounting hole in a center thereof, each mounting hole having an internal connecting device; and
    b) a plurality of supporting rods, each having an external connecting device on two opposing ends, the external connecting device being connected with one of the internal connecting devices.

2. The polyhedron connector and supporting rod assembly according to claim 1, wherein the internal connecting device includes internal threads, and the external connecting device includes external threads.

3. A polyhedron connector comprising:
    a) six, spaced apart, planar quadrilateral faces, each having a mounting hole in a center thereof; and
    b) twelve planar hexagonal faces, each having a mounting hole in a center thereof, wherein each side of each of the quadrilateral faces adjoins one side of one of the hexagonal faces.

\* \* \* \* \*